United States Patent
Oh

(10) Patent No.: US 7,691,504 B2
(45) Date of Patent: Apr. 6, 2010

(54) ANODE SIDE HYDROGEN/OXYGEN INTERFACE FORMATION INHIBITION STRUCTURE OF A FUEL CELL VEHICLE

(75) Inventor: Seung Chan Oh, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 609 days.

(21) Appl. No.: 11/645,278

(22) Filed: Dec. 22, 2006

(65) Prior Publication Data

US 2008/0102330 A1   May 1, 2008

(30) Foreign Application Priority Data

Oct. 27, 2006   (KR) .................. 10-2006-0105258

(51) Int. Cl.
*H01M 8/00*   (2006.01)
*H01M 8/02*   (2006.01)
*H01M 2/00*   (2006.01)

(52) U.S. Cl. .............. 429/12; 429/13; 429/18; 429/34

(58) Field of Classification Search .............. 429/18, 429/34
See application file for complete search history.

(56) References Cited

U.S. PATENT DOCUMENTS

| | | | |
|---|---|---|---|
| 2001/0021468 A1* | 9/2001 | Kanai et al. | 429/12 |
| 2003/0143445 A1* | 7/2003 | Daniel et al. | 429/19 |
| 2006/0040150 A1* | 2/2006 | Yu et al. | 429/13 |

FOREIGN PATENT DOCUMENTS

| | | |
|---|---|---|
| JP | 2001-118594 | 4/2001 |
| JP | 2003-151592 | 5/2003 |
| JP | 2005-038668 | 2/2005 |
| JP | 2005-302609 | 10/2005 |

* cited by examiner

*Primary Examiner*—Melvin C Mayes
*Assistant Examiner*—Joseph V Micali
(74) *Attorney, Agent, or Firm*—Morgan, Lewis & Bockius LLP

(57) ABSTRACT

The present invention relates to an anode side hydrogen/oxygen interface formation inhibition structure of a fuel cell vehicle which prevents a high voltage field due to hydrogen/oxygen interface formation from being formed so that a stable stack driving may be realized when the fuel cell vehicle starts up or shuts down.

8 Claims, 4 Drawing Sheets

ANODE SIDE HYDROGEN/OXYGEN INTERFACE FORMATION INHIBITION STRUCTURE OF A FUEL CELL VEHICLE

CROSS-REFERENCE TO RELATED APPLICATIONS

This application claims priority to and benefit of Korean Patent application NO. 10-2006-0105258, filed on Oct. 27, 2006 in the Korean Intellectual Property Office, the disclosure of which is incorporated herein by reference.

FIELD

The present invention relates to an anode side hydrogen/oxygen interface formation inhibition structure of a fuel cell vehicle which prevents a high voltage field from being formed due to hydrogen/oxygen interface formation so that a stack can be stable when the fuel cell vehicle starts up or shuts down.

BACKGROUND

Generally, a fuel cell is mainly composed of an electrode for the electro-chemical reaction, an electrolyte film for transmitting a hydrogen ion generated by the reaction, and a bipolar plate for supporting the electrode and the electrolyte.

Since a high polymer electrolyte fuel has much higher efficiency as compared with other types of fuel cells. It also has a large current density, a large output density, a short start-up time, and uses a solid electrolyte. Corrosion and electrolyte adjustment are also not necessary for this fuel cell. Because it is an environment-friendly energy source which discharges the pure waters as an exhaust gas, automobile manufacturing companies the world over are now studying high polymer electrolyte fuel cells.

The high polymer electrolyte fuel cell generates water and heat through the electro-chemical reaction of hydrogen and oxygen. At the same time, it generates electricity, where the provided hydrogen is separated into hydrogen ions and electrons at the electrolyte of an anode electrode, and the separated hydrogen ions are transferred to a cathode via the electrolyte film. At this time, the provided oxygen and hydrogen ions are combined into electrons introduced from the exterior conduction lines. Water and electrical energy is generated. The generated theoretical electrical potential is about 1.23V and the reaction equation is as follows:

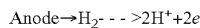

Anode→$H_2$- - ->$2H^+ + 2e$

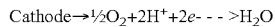

Cathode→$½O_2 + 2H^+ + 2e$- - ->$H_2O$

Actually, a fuel cell for vehicle requires a much higher potential than that mentioned above. Therefore, individual cells are piled-up to obtain a higher potential, and this is called as a stack.

An anode electrode and a cathode electrode are provided at the inner side of the stack, and in the case of start-up or shut-down of a fuel cell, the oxygen in the air is introduced into the stack, and a partial high voltage circuit is formed. Therefore, a drawback exists in that the carbon support material of the cathode side is corroded and disappears, significantly deteriorating the performance of the stack.

SUMMARY

The present invention addresses the above-mentioned drawback by providing an anode side hydrogen/oxygen interface formation inhibition structure of a fuel cell vehicle which prevents a high voltage field from being formed due to the hydrogen/oxygen interface formation so that a stable stack may be obtained when the fuel cell vehicle starts up or shuts down.

The anode side hydrogen/oxygen interface formation inhibition structure of a fuel cell vehicle according to an embodiment of the present invention comprises a first hydrogen exhaust pipe extending toward outside of the stack, as well as a 3-way valve. The valve allows hydrogen supplied to the anode of the stack to be discharged for changing the flow of the hydrogen gas discharged from the stack when the fuel cell vehicle shuts down, and enables nitrogen and the hydrogen consumed at start-up time to be discharged to the atmosphere. The structure also includes a second hydrogen exhaust pipe, one end of which is connected to the 3-way valve of the first hydrogen exhaust pipe and the other end of which is connected to a first check valve for nitrifying the anode side by reacting the oxygen provided via the first check valve opened and operated when the fuel cell shut down, and the hydrogen of the first hydrogen exhaust pipe.

The first hydrogen exhaust pipe comprises a first adjustment valve which is opened, operated, and discharges the nitrogen when the fuel cell vehicle starts up.

The first check valve is set so that it may be opened and closed according to the inside pressure of the second hydrogen exhaust pipe.

A membrane layer including catalyst is formed on the inner sides of the first hydrogen exhaust pipe and the second hydrogen exhaust pipe for allowing the oxygen contained in the air introduced via the first check valve and the hydrogen gas filled in the anode side and the first hydrogen exhaust pipe, to be combined so that water may be produced.

The second hydrogen exhaust pipe comprises a catalyst arranged between 3-way valve and the first check valve, and thus maximizes water generation by using the membrane layer and catalyst.

The second hydrogen exhaust pipe further comprises a storage tank for storing the water produced by the membrane layer and catalyst provided in the first and second hydrogen exhaust pipe; and a second adjustment valve provided on a discharge pipe connected to the storage tank for discharging the water of the storage tank.

A filter unit for filtering the contaminated materials or the organic substances of atmosphere is provided in the second hydrogen exhaust pipe.

The second hydrogen exhaust pipe further comprises a branch pipe one end of which is connected to the first check valve and the other end of which is branched to outside of the stack, and an air exhaust pipe one end of which is connected to a cathode of the stack, and the other end of which is connected to the branch pipe are provided in the second hydrogen exhaust pipe.

A third adjustment valve for preventing the contaminated materials from being introduced into the cathode connected to the air exhaust pipe when the fuel cell vehicle shut down is provided in the air exhaust pipe.

BRIEF DESCRIPTION OF THE DRAWINGS

These and/or other aspects and advantages of the invention will become apparent and more readily appreciated from the following description of the preferred embodiments, taken in conjunction with the accompanying drawings of which.

DETAILED DESCRIPTION OF SOME OF THE EMBODIMENTS

Hereinafter, some of the embodiments according to the present invention will be described with reference to the accompanying drawings. These embodiments are provided so that those skilled in the art can sufficiently understand the present invention, but it should be appreciated that these embodiments may be modified and that the scope of the present invention is not limited to these embodiments.

Figure 1:
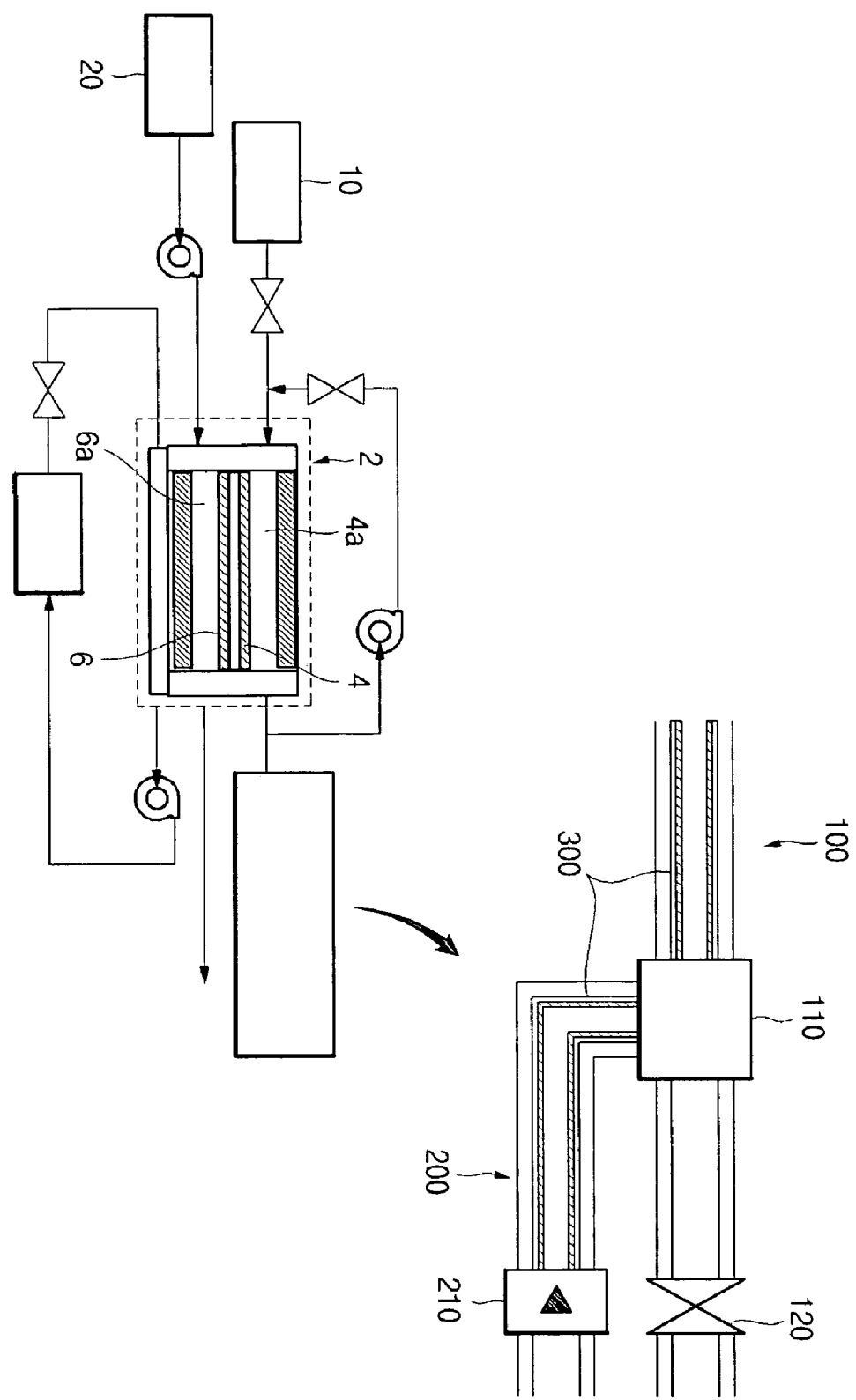
FIG. 1 illustrates an anode side hydrogen/oxygen interface formation inhibition structure of a fuel cell vehicle according to the present invention.

The attached FIG. 1 illustrates an anode side hydrogen/oxygen interface formation inhibition structure of a fuel cell vehicle according to the present invention. FIG. 2-FIG. 5 illustrate an embodiment of an anode side hydrogen/oxygen interface formation inhibition structure of a fuel cell vehicle according to the present invention.

Referring to the attached FIG. 1-FIG. 5, the embodiment comprises a first hydrogen exhaust pipe 100 extending toward outside of the stack 2, and including a 3-way valve 110 for allowing hydrogen supplied to the anode 4 of the stack 2 to be discharged; for changing the flow of the hydrogen gas discharged from the stack 2 when the fuel cell vehicle shuts down; and for enabling nitrogen except hydrogen eliminated at a start-up time to be discharged to the atmosphere. The embodiment further includes a second hydrogen exhaust pipe 200, one end of which is connected to the 3-way valve 110 of the first hydrogen exhaust pipe 100 and the other end of which is connected to a first check valve 210 for nitrifying the anode side by reacting the oxygen provided via the first check valve 210 opened and operated when the fuel cell vehicle shuts down, and the hydrogen of the first hydrogen exhaust pipe 100.

A first adjustment valve 120 which is opened, operated, and discharges the nitrogen when the fuel cell vehicle starts up is provided in the first hydrogen exhaust pipe 100. The first check valve 210 is provided so that it may be opened and closed based on the inside pressure of the second hydrogen exhaust pipe 200.

A membrane layer and catalyst 300 is formed on the inner sides of the first hydrogen exhaust pipe 100 and the second hydrogen exhaust pipe 200 for allowing the oxygen contained in the air introduced via the first check valve 210 and the hydrogen gas filled in the anode side 4 and the first hydrogen exhaust pipe 100 to be combined so that water may be produced.

A catalyst unit 400 may be arranged in the second hydrogen exhaust pipe 200, between the 3-way valve 110 and the first check valve 210 to maximize water generation.

A storage tank 220 for storing the water produced by the membrane layer and catalyst in the first and second hydrogen exhaust pipe 100, 200 is provided in the second hydrogen exhaust pipe 200. A second adjustment valve 230 is provided on a discharge pipe connected to the storage tank for discharging the water of the storage tank 220.

A filter unit 30 for filtering the contaminated materials or the organic substances found in the atmosphere is provided in the second hydrogen exhaust pipe 200. It is preferable that the filter unit 30 employs a structure for filtering papers, nonwoven cloths, and materials introduced from outside. A branch pipe 240, one end of which is connected to the first check valve 210 and the other end of which is branched to outside of the stack 2, and an air exhaust pipe 250, one end of which is connected to a cathode of the stack and the other end of which is connected to the branch pipe 240, are provided in the second hydrogen exhaust pipe 200. A third adjustment valve 252 for preventing the contaminated materials from being introduced into the cathode 6 is connected to the air exhaust pipe 250 when the fuel cell vehicle shuts down. The anode side hydrogen/oxygen interface formation inhibition structure of the fuel cell vehicle according to the present invention having above-mentioned structure will be explained with referring to the drawings.

Referring to FIG. 1, when a driver enters a fuel cell vehicle and starts up, oxygen and hydrogen are supplied into the stack 2 via a fuel supply unit 10, and an air supply unit 20. Hydrogen provided to the stack 2 is supplied to an anode flow field 4a, and oxygen in the air provided via the air supply unit 20 is supplied to a cathode flow field 6a. Then a chemical reaction occurs and hydrogen is expelled from the stack 2 along the first hydrogen exhaust pipe 100. At this time, the first adjustment valve 120 is opened and operated, and thereby hydrogen, remaining oxygen, and nitrogen are discharged. In this way, when starting-up, the 3-way valve 110 arranged in the first hydrogen exhaust pipe 100 is opened so that hydrogen is discharged through the first adjustment valve 120.

When in a stopped state of the fuel cell vehicle, the 3-way valve 110 is switched so that the gas flows to the second hydrogen exhaust pipe 200. At this time, the inside of the anode flow field 4a and the first hydrogen exhaust pipe 100 is filled with hydrogen, and water is generated due to the reaction of oxygen and hydrogen transferred via the cathode flow field 61 and the cathode 6. While the reaction is being performed continuously in the anode flow field 4a, hydrogen is drying slowly, and the pressure of the anode flow field 4a decreases to below atmospheric pressure. In this way, while the pressure of the anode flow field 4a is decreasing to below the atmospheric pressure, the first check valve 210 is opened so that oxygen in the atmosphere, and the air containing nitrogen are provided to the first hydrogen exhaust pipe 100 via the first adjustment valve 120, and the second hydrogen exhaust pipe 200. A membrane layer and catalyst 300 is formed inside the first hydrogen exhaust pipe 100 and the second hydrogen exhaust pipe 200, and thus water is generated due to reaction of the catalyst provided to the membrane 300, the provided oxygen, and the air.

Above reaction is performed incessantly until all hydrogen existing inside the first hydrogen exhaust pipe 100 and the second hydrogen exhaust pipe 200 are discharged. If all hydrogen is discharged, the inside pressure of the first hydrogen exhaust pipe 100 and the second hydrogen exhaust pipe 200 becomes equal to the external pressure, the first check valve 210 is closed automatically, and the inner sides of the first hydrogen exhaust pipe 100 and the second hydrogen exhaust pipe 200 are filled with hydrogen.

When the fuel cell vehicle starts up, the 3-way valve 110 is switched to the first adjustment valve 120, and even if oxygen and hydrogen are provided via the fuel supply unit 10, since the anode 4 side is filled with hydrogen, the hydrogen/oxygen interface is not formed, and thus it becomes possible to improve durability of the fuel cell.

Figure 2:
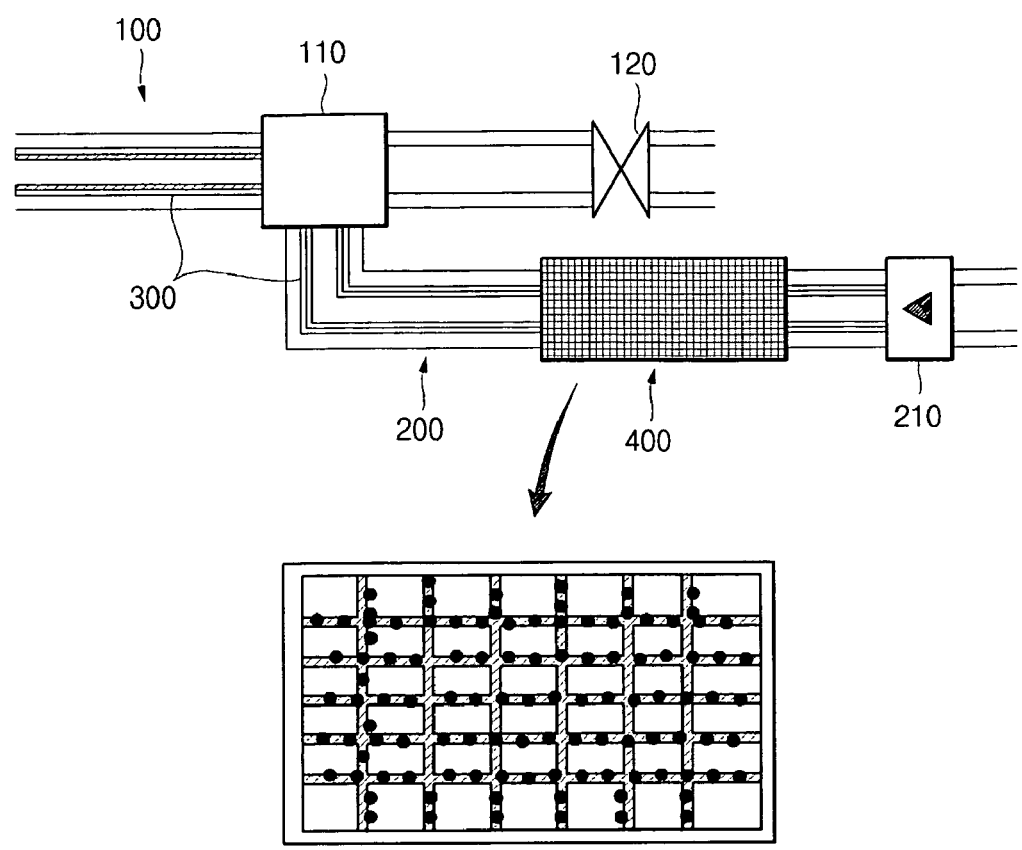
FIG. 2-FIG. 5 illustrate an embodiment of an anode side hydrogen/oxygen interface formation inhibition structure of a fuel cell vehicle according to the present invention.

Another embodiment of the present invention will be explained with reference to FIG. 2. It is to be understood that it is possible to arrange a catalyst unit 400 on a line of the second hydrogen exhaust pipe 200, and the catalyst unit 400 includes a carbon supporter on the membrane layer in order to maximize the hydrogen/oxygen interface, and is provided inside a container body. The catalyst unit 400 generates water by interacting with the membrane layer and catalyst 300, the operation method thereof is same as described above.

Figure 3:
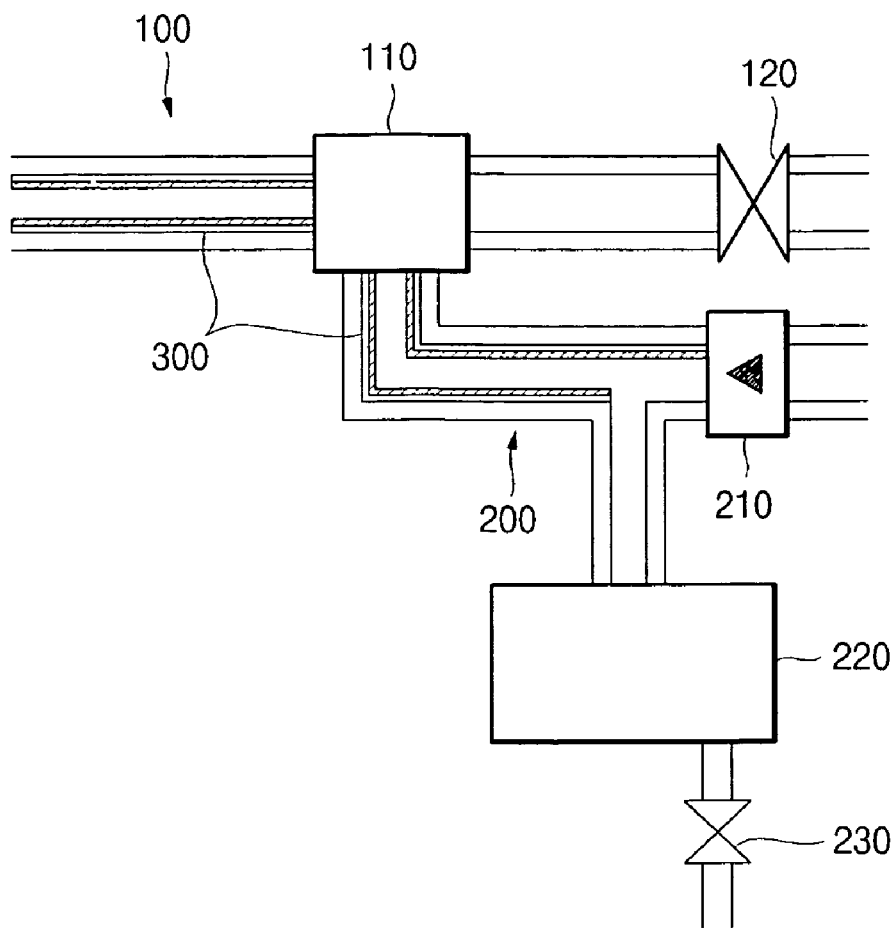

Referring FIG. 3, as shown in FIG. 1, when much water is generated due to reaction of hydrogen/oxygen, much water exists inside the first hydrogen exhaust pipe 100 and the second hydrogen exhaust pipe 200. As a result, reaction of membrane 300 is hindered, and freezing may occur during the winter season. Therefore, as shown in the drawings, it is preferable to store the water inside the first hydrogen exhaust pipe 100 and the second hydrogen exhaust pipe 200 in a storage tank 200. In this way, in case of start-up of the fuel cell vehicle, the water stored in the storage tank 220 is discharged to outside of the vehicle by the opened second adjustment valve 230.

Figure 4:
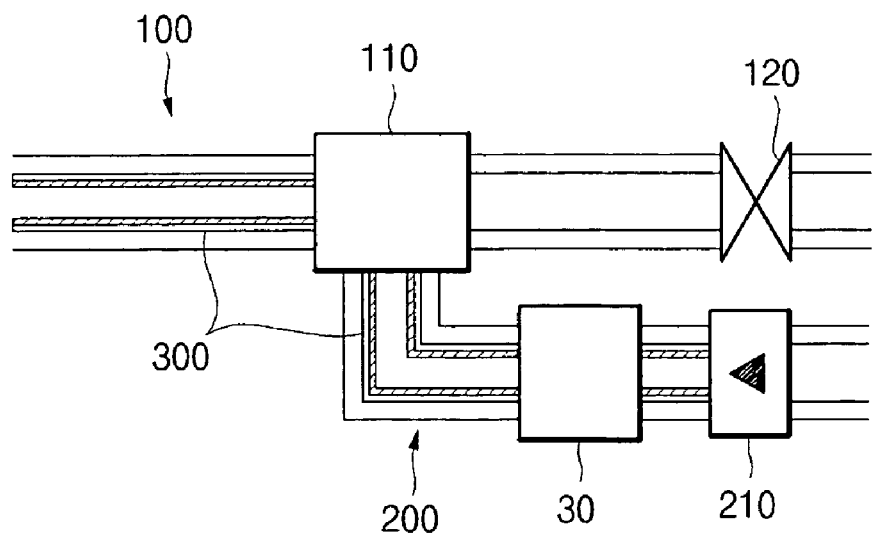

Referring to FIG. 4, a filter unit 30 may be arranged in the second hydrogen exhaust pipe 200, to filter contaminated materials (CO, HC, $O_3$, $H_2S$) in the atmosphere, as well as organic substances.

Figure 5:
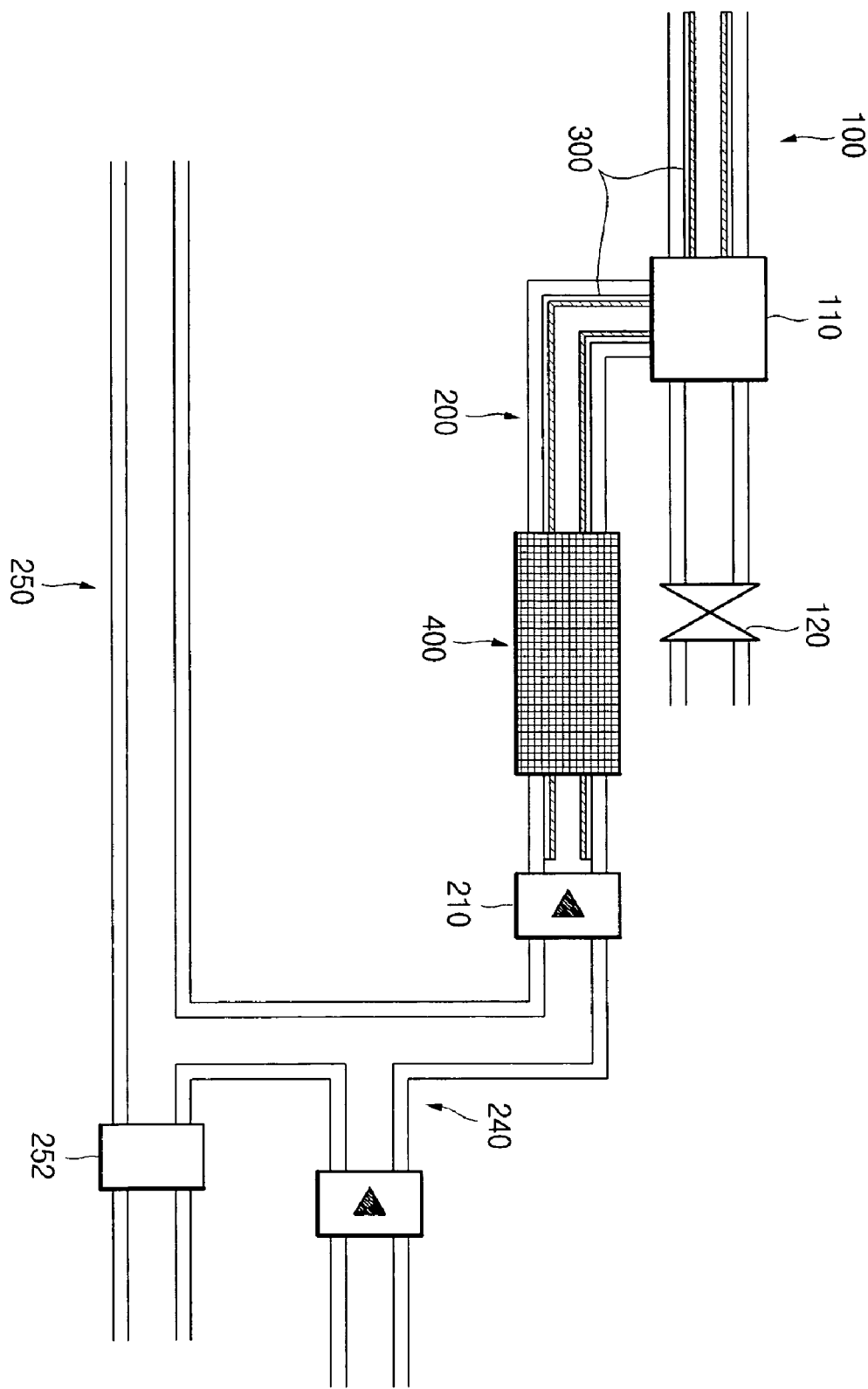

Referring to FIG. 5, as shown in the drawings, when an air exhaust pipe 250 and a branch pipe 240 connected to the cathode 6 side is connected to the second hydrogen exhaust pipe 200, if a sound pressure is applied to the anode 4 side, the anode 4 and the cathode 6 may be damaged due to fatigue. Therefore, it is possible to maintain the inside pressure of the stack uniform by connecting the air exhaust pipe 250 to the cathode 6. Furthermore, since the third adjustment valve 252 is provided, the polluted materials are prevented from being introduced into the cathode 6. Accordingly, the stack is prevented from being damaged because hydrogen/oxygen interface is not formed at the anode 4 side when the fuel cell vehicle starts up or shuts down.

It is to be understood that various kinds of modifications may be executed by the person having a common knowledge in the art to which the present invention belongs without deviating the gist of the present invention.

As described above, the preferred embodiment of the present invention is disclosed through the descriptions and the drawings. The terms are used not to define the meanings thereof or restrict the scope of the present invention described in the claims but to explain the present invention. Therefore, it would be appreciated by those skilled in the art that changes might be made in this embodiment without departing from the principles and spirit of the invention, the scope of which is defined in the claims and their equivalents.

As explained above, an anode side hydrogen/oxygen interface formation inhibition structure of a fuel cell vehicle reduces a high voltage field due to hydrogen/oxygen interface formation from being formed so that a stable stack may be realized when the fuel cell vehicle starts up or shuts down.

Further, performance deterioration of a stack caused by the introduction of foreign materials can be prevented by preventing the contaminated materials in the atmosphere from being introduced into the stack. Further, corrosion of the carbon material can be provided in a high-price stack.

What is claimed is:

1. An anode side hydrogen/oxygen interface formation inhibition structure of a fuel cell vehicle, in a stack comprising:
   a fuel supply unit for supplying fuel containing hydrogen; and an air supply unit for supplying air containing oxygen for generating electrical energy by an electrochemical reaction of oxygen and hydrogen supplied from each of the fuel supply unit and the air supply unit, the structure comprising:
   a first hydrogen exhaust pipe extending toward outside of the stack, and including a 3-way valve for allowing hydrogen supplied to the anode of the stack to be discharged for changing the flow of the hydrogen gas discharged from the stack when the fuel cell vehicle shuts down, and for enabling nitrogen and hydrogen consumed at a start-up time to be discharged to atmosphere; and
   a second hydrogen exhaust pipe, one end of which is connected to the 3-way valve of the first hydrogen exhaust pipe and the other end of which is connected to a first check valve for nitrifying the anode side by reacting the oxygen provided via the first check valve opened and operated when the fuel cell vehicle shuts down, and the hydrogen of the first hydrogen exhaust pipe,
   wherein a membrane layer and catalyst is formed on the inner side of the first hydrogen exhaust pipe and the second hydrogen exhaust pipe for allowing the oxygen contained in the air introduced via the first check valve and the hydrogen gas filled in the anode side and the first hydrogen exhaust pipe, to be combined so that water may be produced.

2. The anode side hydrogen/oxygen interface formation inhibition structure of a fuel cell vehicle set forth in claim 1, wherein the first hydrogen exhaust pipe comprises a first adjustment valve which is opened, operated, and discharges the nitrogen when the fuel cell vehicle starts up.

3. The anode side hydrogen/oxygen interface formation inhibition structure of a fuel cell vehicle set forth in claim 1, wherein the first check valve is set so that it may be opened and closed according to the inside pressure of the second hydrogen exhaust pipe.

4. The anode side hydrogen/oxygen interface formation inhibition structure of a fuel cell vehicle set forth in claim 1, wherein the second hydrogen exhaust pipe comprises a catalyst unit arranged between the 3-way valve and the first check valve, to maximizes water generation by using the membrane layer.

5. The anode side hydrogen/oxygen interface formation inhibition structure of a fuel cell vehicle set forth in claim 1, wherein the second hydrogen exhaust pipe further comprises a storage tank for storing water produced by a membrane and catalyst provided in the first and second hydrogen exhaust pipe; and
   a second adjustment valve provided on a discharge pipe connected to the storage tank for discharging the water of the storage tank.

6. The anode side hydrogen/oxygen interface formation inhibition structure of a fuel cell vehicle set forth in claim 1, wherein a filter unit for filtering contaminated materials or organic substances is provided in the second hydrogen exhaust pipe.

7. The anode side hydrogen/oxygen interface formation inhibition structure of a fuel cell vehicle set forth in claim 1, wherein a branch pipe one end of which is connected to the first check valve and the other end of which is branched to outside of the stack, and an air exhaust pipe one end of which is connected to a cathode of the stack, and the other end of which is connected to the branch pipe are provided in the second hydrogen exhaust pipe.

8. The anode side hydrogen/oxygen interface formation inhibition structure of a fuel cell vehicle set forth in claim 7, wherein a third adjustment valve for preventing contaminated materials from being introduced into the cathode connected to the air exhaust pipe when the fuel cell vehicle shuts down is provided in the air exhaust pipe.

* * * * *